Nov. 4, 1952  E. W. RIBLETT  2,616,914
PROCESS FOR CATALYTIC CONVERSION
Filed May 11, 1946
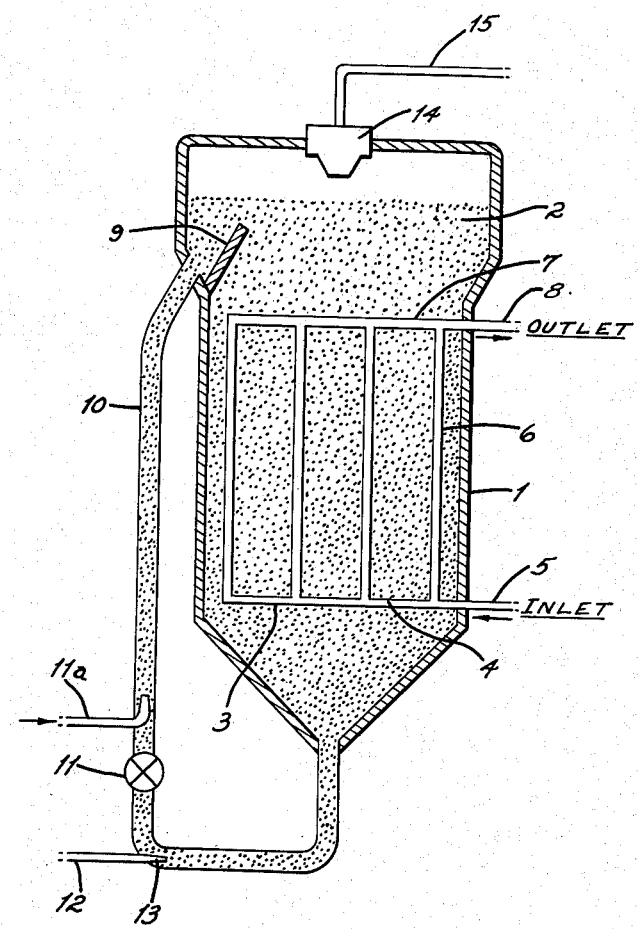
INVENTOR.
EARL W. RIBLETT
BY Patented Nov. 4, 1952

2,616,914

UNITED STATES PATENT OFFICE 2,616,914

PROCESS FOR CATALYTIC CONVERSION

Earl W. Riblett, Tenafly, N. J., assignor to Hydrocarbon Research, Inc., New York, N. Y., a corporation of New Jersey Application May 11, 1946, Serial No. 669,007

2 Claims. (Cl. 260—449.6)

This invention relates to the art of catalytic conversion and more particularly is concerned with the catalytic interaction of gaseous reactants in the presence of a fluidized catalyst mass.

As is known the fluidized technique of operation is advantageous in permitting contact of gaseous or vaporized reactants with catalyst surfaces under very closely controlled conditions, and is particularly advantageous in the case of exothermic reactions where the liberated heat of reaction is transferred from the fluidized catalyst to cooling surfaces under such conditions that a quite uniform predetermined temperature may be maintained. As is further known, the technique of fluidization involves the aeration of the powdered of particulate catalyst by means of reactant gases so that each particle is suspended and yet undergoes slippage in the gases; the particles describe random movements and the mass of particles assumes the appearance of a boiling liquid.

Among the disadvantages of this type of process, however, is the fact that the effluent reaction gases inevitably tend to entrain some proportion of the catalyst particles. These particles continue to catalyze the reaction of the unreacted or incompletely reacted constituents of the effluent entraining gases. However, departure of the entrained particles from the catalyst mass usually marks cessation of any effective temperature control. Where the reaction is exothermic, the careful maintenance of operating temperature obtaining in the reaction zone by virtue of cooling surfaces disposed in heat exchange relationship with the fluidized catalyst mass is not effective above the so-called pseudo-liquid level of the fluidized mass. Particularly in the vicinity of the filters, cyclones, and any other separating devices used for removing the entrained particles, the reaction tends to go on with a corresponding uncontrolled rise in localized temperature of the catalyst particles, formation of uncontrolled and undesired products, degradation of the desired product and general deterioration of the catalyst. Moreover, the highly carbonized catalyst tends to clog and impair operation of the separating devices.

So also in the fluidized system of operation there is a definite practical relationship between the size of the catalyst particles and the rate of gaseous flow required to hold the particles in a true condition of fluidization. Where it is desirable to limit or restrict the available contact surfaces with respect to the flow of reactant gases coming in contact therewith, since limitation of the area of active contact surfaces usually means an increase in the average particle size of the catalyst, a condition is ultimately met wherein the particles can no longer be increased in size without losing the effects of random vibratory movement of the particles in good dense phase suspension. In other words for any predetermined linear rate of reactant flow there is a particle size above which good fluidization is impractical.

One important object of the present invention contemplates the effective fluidization of relatively large size catalyst particles under conditions of fluidization characteristic of smaller particles. Another object of the invention is to fluidize relatively large particles of catalyst under such conditions that the particles while maintained in a state of suspension in the reactant gases for free random movement, nevertheless are not entrained and carried out of the catalyst bed by the gaseous effluent.

In accordance with the present invention catalyst particles of such size, mass and shape that they are physically incapable of being fully entrained and carried out of the reaction zone by the flow of reactant gases, are maintained in a state of dense phase fluidization by the presence, in admixture therewith, of discrete particles of inert material having a substantially smaller settling rate and adapted to assume a good condition of fluidization in the prevailing flow of reactant gases. In the copending Sullivan application for U. S. Letters Patent, Serial No. 729,411, filed February 18, 1947, there is disclosed a process for exothermic reaction of gasiform feed materials in the presence of a fluidized mass composed of catalytic active particles intermixed with discrete particles of inert solid material. As pointed out in that application it is desirable in most instances to maintain a uniform admixture of the inert and active particles of the powder by selecting particles of approximately the same size, or alternatively selecting relative sizes so related to the density or other characteristics of the respective materials that good admixture will prevail. It is also pointed out that the inert material, by increasing the surface area of the total powdered mass in contact with the available cooled surfaces, tends to enhance heat transfer and thus permit an exceptionally good condition of heat control even in the case of exothermic reactions carried out at a high rate of conversion.

In accordance with the present invention substantially the same advantages are available although the inert particles may possess a substantially smaller diameter than that of the catalyst. In addition, the relatively smaller particles supported in turbulent motion in the reactant flow continuously impinge and buoy up the larger catalyst particles and, in effect, create a similar condition of turbulence in respect to these larger particles. By means of this action the catalyst per se can be held in a good state of fluidization at flow rates of the gaseous reactants such that there is no reasonable possibility of catalyst entrainment in the effluent gases to the extent that such particles thereof will be carried out of the fluidized bed and to the separating devices. On the contrary the gaseous flow may be so controlled that the total inevitable entrainment will be limited to a portion only of the finely powdered inert diluent which obviously is incapable of any appreciable catalytic action and therefore free from the disadvantage which characterizes catalyst so entrained.

The tendency for classification between the relatively large and small particles makes it advisable to provide some means for continuously maintaining a homogeneous admixture. This however can be easily obtained by any suitable apparatus for mechanically admixing the contents of the reaction chamber or returning the smaller particles to the lower portion of the fluidized bed.

While the invention is applicable, in general, to catalytic processes wherein gasiform reactants interact with the substantial liberation of exothermic heat, I prefer for purposes of convenience to describe it particularly in connection with the catalytic interaction of carbon oxide and hydrogen in the synthesis of hydrocarbons. As is known the catalyst may comprise any of the known effective metals of the iron group, such as iron, cobalt, nickel, or ruthenium together with suitable activators and promoters. Advantageously the catalyst powder may consist of iron particles containing about 1 to 2% of potassium oxide and about 2 to 3% alumina. Among the wide field of known promoters and activators are compounds of alkali and alkaline earth metals, oxides of thorium, uranium, vanadium and many others, up to as high as 5% concentration or higher. The catalyst may be supported or not, as desired, upon any convenient supporting material such as diatomaceous earth, silica gel, and any of the Filtrol clays.

To permit proper fluidization, the catalyst powders heretofore used normally consist of particles finer than 100 mesh, preferably finer than 200 mesh, and fluidization is only accomplished with some difficulty with larger sized particles. In each case, however, it will be understood that the maximum size of the particles will depend, within the limits of ultimate practicability, upon the linear rate of flow of reactant gases. Where a substantial proportion of finely divided inert powdered material is admixed uniformly with the larger particles, a rate of reactant flow may be selected such that the entire mass is maintained in uniform fluidized condition with a well defined pseudo-liquid level and there is substantially no entrainment of the larger particles in the effluent gases above this level; this same rate of reactant flow would be too low to give good fluidization of the coarse catalyst particles in the absence of the fine inert powder.

More particularly, the invention is applicable to catalyst particles of between 40 and 100 mesh size although in its broadest aspect it contemplates use of any catalyst particle in admixture with a relatively inert diluent of substantially smaller settling rate.

The particles of inert solid material have on the other hand such substantially smaller particle size or smaller settling rate that they can be maintained readily in a condition of dense phase fluidization by a gas flow which would be inadequate in the case of the coarser catalyst particles alone. In short, the inert particles are so selected that a linear velocity of gasiform reactants effective to maintain a good condition of dense phase fluidization of such fine particles gives effective turbulent support to the relatively coarse catalyst particles in the mass.

The discrete inert particles may be selected from a wide range of substances including fine sand, silica, glass and other vitreous materials. However, the invention is in no way limited to such products since the inert particles may in general be selected from any powdered solid material which remains solid under the reaction conditions of the catalytic synthesis process and which is not appreciably active to promote or suppress such reaction. Graphite and coke are useful for this purpose. Of the common metals, aluminum powder is suitable, and copper, while indicated to have some catalytic effect in intimate chemical association with other catalytic materials, nevertheless is substantially inert when employed as discrete particles of powder in the present system. So also there may be employed a relatively finely powdered, completely spent and thus substantially inactive, metallic catalyst derived from the present process; as for example any of the usual iron or cobalt catalysts which have substantially lost their catalytic activity in the operation. So also powdered cast iron with a normally high phosphorus content is likewise suitable.

By the term "particles of inert diluent materials" and similar expressions, I mean particles separate and distinct from those of the catalyst, which have no material or substantial catalytic effect in the process. It is true, of course, that widely varied materials otherwise classed as inert may possess some minute or insignificant catalytic activity with respect to some aspects of the complex operations going on in the reaction zone. The foregoing term, however, refers to materials having no, or such low catalytic effect with respect to the exothermic reaction to be carried out, as to be of no commercial significance as a catalyst.

In practicing the present invention it is normally desirable to limit the proportion of relatively fine inert particles. In general, for catalysts of good activity the proportion of inert fines admixed with the catalytic particles in the reaction zone may be within the range of 1 or 2 parts of inert fines for each part of catalyst, although such proportion may fall as low as 0.1 part or be as great as 5 or 10 parts per part of catalyst or higher. The proportions herein are expressed on the basis of settled volumes of the materials in question.

For any specific type and size of catalyst grains and any pre-selected relatively fine inert powder, the proper proportioning may readily be arrived at by experimentation to determine that proportioning required to promote uniform fluidization at any desired linear velocity of reactant flow preferably such that the catalyst particles are not carried out of the mass in the reaction effluents withdrawn from the upper surface of the fluidized mass. Briefly the various proportions are submitted to test in a well designed reactor under reaction conditions until proper fluidization is accomplished with no entrainment of catalyst particles. It is particularly important to note however that in making this determination a proportion of inert particles should advantageously be selected such that there is substantially no impairment of the reaction nor decrease in yield in the desired hydrocarbons and/or oxygenated hydrocarbons.

Referring now to the drawing wherein I have disclosed for purposes of exemplification one illustrative apparatus suitable for the present operation, the numeral 1 indicates a reactor of more or less conventional configuration occupied internally by a mass of powdered coarse particle catalyst admixed with a porportion of relatively fine inert powder, the charge being designated by the numeral 2.

The temperature within the reaction zone is controlled by the cooling surfaces of a heat exchanger 3 shown more or less symbolically and comprising lower header 4 supplied by a liquid coolant through the inlet pipe 5 and feeding a series of cooling tubes 6. The cooling tubes 6 at their upper ends merge with a header 7 communicating with outlet tube 8. As is well-known in the art, it is desirable to provide heat exchange means which do not impair the uniformity of reactant flow and fluidization. To this end the heat exchanger, only diagrammatically shown in the drawing, should be carefully designed to prevent dead spots of catalyst. Advantageously it may take the form of cooling jackets, bayonet type cooling tubes, or a series of vertically extending catalyst chambers surrounded by cooling jackets. So also external cooling and recycling of the reactants and/or the catalyst may be utilized in accordance with procedures known in the art.

A baffle wall 9 formed in the upper portion of the chamber and having its upper edge in the vicinity or slightly below the normal pseudo-liquid surface of the fluidized mass provides, in effect, a collecting hopper for relatively fine particles which tend to distribute toward the upper surface in accordance with the normal classification tendency of the system. The space behind the baffle wall 9 communicates with a standpipe 10 provided with a suitable feeding device 11. The feeder 11 may be a star feeder or any other conventional type of device adapted to control the flow of the particles of powder downwardly. A stream of gas, such as hydrogen or recycle gas, is introduced through pipe 11a to maintain the powder in standpipe 10 in a free-flowing condition.

Fresh feed gases are continuously supplied from a source not shown through an inlet line 12 to an injector 13 where they pick up the particles of fines and reinject them into the lower portion of the catalyst mass in the reactor 1.

By this means it will be apparent that the fines, which tend to accumulate at the upper portion of the reactor 1 are continuously recirculated to the lower portion of the reactor in order to maintain the required intermixture of relatively fine and coarse particles. Obviously in the light of the foregoing disclosure the feeder 11 may be operated at such a rate as to maintain the desired admixture.

It is particularly important to note that under the present system of operation relatively high velocities of reactant flow may be employed without catalyst entrainment in the effluent gases. Thus in the embodiment shown and with the catalyst in a state of dense phase fluidization characterized by pseudo-liquid level as indicated, the effluent gases emanating therefrom pass to a filter element 14 which permits passage of the gasiform products of reaction into the outlet pipe 15 while retaining solid particles within the reactor. The filter element 14 may be formed of a suitable porous refractory material such as alundum or may comprise any equivalent filters known in the art. When operating the present device under optimum gas flow, the only particles entrained will be the relatively fine, inert particles which tend to collect on the filter. Where the particles tend to adhere to the filter surfaces they in no way impair the reaction because of their inactive character and relative inability to affect products of reaction or any unreacted or incompletely reacted constituents of the effluent gas. Any undesired accumulation of such fines upon the filter may be removed periodically by a brief countercurrent blast of inert gas through the pipe 15.

It will be understood that the gasiform products from the pipe 15 will pass to apparatus not shown for further treatment, reuse or recovery of the contained products. It is important to note that the foregoing apparatus is only intended to illustrate one form of reactor suitable for overcoming a tendency to classification of fluidized powders of different sizes and any other type of reactor capable of accomplishing this result may be substituted therefor.

By way of illustrating the details of one preferred process operated in accordance with the within principles, a reactor such as indicated in Figure 1 is supplied with a particulate catalyst having a grain or particle size falling within the range of 40 to 100 mesh, and composed of iron with about 1.5% of potassium oxide ($K_2O$) and about 2% alumina. Fine sand having a particle size of 140 mesh and finer with about 90% passing a 200 mesh screen and about 60% passing a 325 mesh screen, is thoroughly admixed with the catalyst in the reactor. The mixture comprises approximately one part by volume of the fine sand to one part by volume of the settled catalyst. The standpipe and hopper are provided with an additional supply of the sand and operation is carried out by introducing fresh feed synthesis gas containing about 86% of a mixture of hydrogen and carbon monoxide in the respective molar ratio of 2:1. The remainder of the synthesis gas consists essentially of about 9% carbon dioxide and 5% methane. The gases are introduced to the powdered mass in the reactor at an inlet rate corresponding to an internal linear velocity of about 2 feet per second, neglecting the volume occupied by the powder and considering the gases at the temperature and pressure of the reactor. The operating conditions within the reactor involve a pressure of 200 pounds per square inch gauge and a temperature of 600° F. The height of the fluidized mass to the pseudo-liquid level is approximately 12 feet.

Operating under the foregoing conditions, conversion of the reactant gases is about 50% completed with a yield, based on the quantity of carbon monoxide consumed, equal to about 95% of theoretical. No difficulty is experienced over long periods of operation with filter clogging or with an accumulation of active catalyst upon the filter surface.

It is, of course, understood that the reaction may be conducted in successive stages wherein a second stage reactor, similar or identical with that used in the first stage, is supplied with the reactant effluent from the first reactor preferably but not necessarily, after separation of the normally liquid constituents thereof.

While the specific catalyst and conditions of operation have been disclosed, the invention is not so limited but may be operated in connection with any particular catalyst and reactant feed effective to promote a catalytic vapor phase reaction with the liberation of exothermic energy. Obviously, the optimum conditions of reaction will depend upon the catalyst and reactant feeds employed. In the case of hydrocarbon synthesis, for example, employing a cobalt catalyst temperature of around 400° F. and pressures approximating atmospheric will normally be preferred. Other catalytic operations are, for example, (1) oxidation of organic compounds with oxygen to give valuable intermediate organic compounds such as phthalic anhydride from naphthalene, methanol and formaldehyde from methane, ethylene glycol from ethane, etc., (2) partial removal of carbonaceous deposits from carbonized catalysts by combustion with oxygen, (3) selective polymerization of higher olefins in a mixture of several olefins without undesirable subsequent polymerization of lower olefins after the reaction vapors leave the fluidized catalyst mass.

For the purposes of this invention, it is important that the inert diluent powder have a smaller settling rate than that of the catalyst powder employed. The rate of settling of a powder is dependent upon the size, shape and density of the particles, and generally it is convenient to select a powder of smaller particle size to attain a smaller settling rate. This explains the frequent references in this specification to relatively fine inert particles and relatively coarse catalyst particles. Broadly, however, the inert powder does not have to be any finer and may even be coarser than the catalyst powder if there is sufficient difference in the densities of the inert and catalyst particles. Thus, for instance, powdered graphite because of its low density and plate-shaped particles might have a coarser particle size than the powdered catalyst used in the reactor and still be operative in accordance with the principles of this invention. Those familiar with fluidization will appreciate that a powder of smaller settling rate is one whose particles tend to fall or settle less rapidly through the gaseous suspending medium than do the particles of a powder having a greater settling rate. It is readily possible for one skilled in the art to select a proper diluent and catalyst for any operation in view of the foregoing principles supported by experimental tests.

It will moreover be apparent from the foregoing, that in the optimum operation of the process it will be desirable to select a mixture of particles of such relative settling rates that for the rate of gas flow employed there will result good fluidization of the particles of higher settling rate without entrainment thereof in the gaseous outflow and yet without excessive classification.

Obviously many modifications and variations of the invention as described above may be made without departing from the spirit and scope thereof, and thus only such limitations should be imposed as are indicated in the appended claims.

I claim:
1. In an exothermic catalytic process which involves passing a gaseous reactant up through a dense phase fluidized bed containing particulate catalyst maintained under close temperature control by cooling surfaces immersed in said fluidized bed and subjected to temperature control by the continuous circulation of a coolant in contact therewith and in indirect heat transfer relationship to said fluidized bed to effect the desired exothermic reaction to a substantial but incomplete extent and withdrawing from said fluidized bed a gaseous effluent containing a substantial amount of said gaseous reactant and particles entrained from said fluidized bed in addition to the desired reaction products, the improvement of enhancing said close temperature control of said fluidized bed and of preventing uncontrolled exothermic catalytic reaction in the withdrawn gaseous effluent, which comprises maintaining a substantial proportion of finely divided inert solid in admixture with said particulate catalyst in said fluidized bed thereby enhancing said close temperature control of said fluidized bed, said inert solid having an appreciably smaller settling rate than that of said particulate catalyst, passing said gaseous reactant up through said fluidized bed at a rate to effect accumulation of said inert solid at the top of said fluidized bed and preferential entrainment of said inert solid to the substantial exclusion of said particulate catalyst from the top of said fluidized bed in said withdrawn gaseous effluent thereby preventing uncontrolled exothermic catalytic reaction in said withdrawn gaseous effluent, and conveying said inert solid from the top of said fluidized bed to the bottom thereof at a rate to maintain said substantial proportion of said inert solid in admixture with said particulate catalyst in spite of the tendency of said inert solid to accumulate at the top of said fluidized bed and to be preferentially entrained from the top of said fluidized bed in said withdrawn gaseous effluent.

2. In the exothermic catalytic process for the synthesis of hydrocarbons, oxygenated hydrocarbons and mixtures thereof which involves passing synthesis gas comprising hydrogen and carbon monoxide up through a dense phase fluidized bed containing particulate synthesis catalyst maintained under close temperature control by cooling surfaces immersed in said fluidized bed and subjected to temperature control by the continuous circulation of a coolant in contact therewith and in indirect heat transfer relationship to said fluidized bed to effect the desired exothermic reaction to a substantial but incomplete extent and withdrawing from said fluidized bed a gaseous effluent containing a substantial amount of hydrogen and carbon monoxide and particles entrained from said fluidized bed in addition to the desired reaction products, the improvement of enhancing said close temperature control of said fluidized bed and of preventing uncontrolled exothermic catalytic reaction in the withdrawn gaseous effluent, which comprises maintaining a substantial proportion of finely divided inert solid in admixture with said particulate synthesis catalyst in said fluidized bed thereby enhancing said close temperature control of said fluidized bed, said inert solid having an appreciably smaller settling rate than that of said particulate synthesis catalyst, passing said synthesis gas up through said fluidized bed at a rate to effect accumulation of said inert solid at the top of said fluidized bed and preferential entrainment of said inert solid to the substantial exclusion of said particulate synthesis catalyst from the top of said fluidized bed in said withdrawn gaseous effluent thereby preventing uncontrolled exothermic catalytic reaction in said withdrawn gaseous effluent, and conveying said inert solid from the top of said fluidized bed to the bottom thereof at a rate to maintain said substantial proportion of said inert solid in admixture with said particulate synthesis catalyst in spite of the tendency of said inert solid to accumulate at the top of said fluidized bed and to be preferentially entrained from the top of said fluidized bed in said withdrawn gaseous effluent.

EARL W. RIBLETT.

REFERENCES CITED

The following references are of record in the file of this patent:

UNITED STATES PATENTS

| Number | Name | Date |
|---|---|---|
| 2,360,787 | Murphree et al. | Oct. 17, 1944 |
| 2,383,636 | Wurth | Aug. 28, 1945 |
| 2,393,636 | Johnson | Jan. 29, 1946 |
| 2,393,909 | Johnson | Jan. 29, 1946 |
| 2,396,109 | Martin | Mar. 5, 1946 |
| 2,417,164 | Huber, Jr. | Mar. 11, 1947 |
| 2,443,673 | Atwell | June 22, 1948 |
| 2,456,306 | Nicholson | Dec. 14, 1948 |
| 2,464,616 | Schwarzenbek et al. | Mar. 15, 1949 |
| 2,468,521 | Sweetser et al. | Apr. 26, 1949 |